US011661705B2

(12) United States Patent
Bony et al.

(10) Patent No.: US 11,661,705 B2
(45) Date of Patent: May 30, 2023

(54) COMPOSITION FOR PAPER COATING SLIP

(71) Applicant: COATEX, Genay (FR)

(72) Inventors: Francis Bony, Quincieux (FR); Clementine Champagne, Caluire-et-Cuire (FR); Francois Dupont, Lyons (FR); Laurie Parrenin, Genay (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 396 days.

(21) Appl. No.: 16/764,262

(22) PCT Filed: Dec. 17, 2018

(86) PCT No.: PCT/FR2018/053317
§ 371 (c)(1),
(2) Date: May 14, 2020

(87) PCT Pub. No.: WO2019/122640
PCT Pub. Date: Jun. 27, 2019

(65) Prior Publication Data
US 2020/0370245 A1 Nov. 26, 2020

(30) Foreign Application Priority Data
Dec. 18, 2017 (FR) .................................... 17 62325

(51) Int. Cl.
| | | |
|---|---|---|
| *D21H 19/58* | (2006.01) | |
| *C09D 133/08* | (2006.01) | |
| *C09D 133/10* | (2006.01) | |
| *C09D 133/14* | (2006.01) | |
| *C09D 171/02* | (2006.01) | |
| *D21H 19/38* | (2006.01) | |
| *D21H 19/60* | (2006.01) | |
| *D21H 21/52* | (2006.01) | |
| *C08K 7/18* | (2006.01) | |
| *C08L 33/02* | (2006.01) | |
| *C08L 71/02* | (2006.01) | |
| *C08L 99/00* | (2006.01) | |
| *D21H 23/30* | (2006.01) | |

(52) U.S. Cl.
CPC .............. *D21H 19/58* (2013.01); *C08K 7/18* (2013.01); *C08L 33/02* (2013.01); *C08L 71/02* (2013.01); *C08L 99/00* (2013.01); *C09D 133/08* (2013.01); *C09D 133/10* (2013.01); *C09D 133/14* (2013.01); *C09D 171/02* (2013.01); *D21H 19/385* (2013.01); *D21H 19/60* (2013.01); *D21H 21/52* (2013.01); *D21H 23/30* (2013.01); *C08L 2201/54* (2013.01)

(58) Field of Classification Search
CPC ...... D21H 19/58; D21H 19/385; D21H 19/60; D21H 21/52; C09D 133/08; C09D 133/10; C09D 133/14; C09D 171/02; C08K 7/18; C08L 71/02; C08L 33/02; C08L 99/00; C08L 2201/54
USPC ....................................................... 162/168.1
See application file for complete search history.

(56) References Cited

U.S. PATENT DOCUMENTS

| | | |
|---|---|---|
| 7,138,160 B1 | 11/2006 | Dupont et al. |
| 2004/0151886 A1 | 8/2004 | Bobsein et al. |
| 2005/0215704 A1 | 9/2005 | Bobsein et al. |
| 2005/0288428 A1 | 12/2005 | Dupont et al. |
| 2009/0170982 A1* | 7/2009 | Dupont .................. D21H 19/58 524/556 |
| 2011/0251307 A1 | 10/2011 | Souzy et al. |
| 2011/0256085 A1 | 10/2011 | Talingting Pabalan et al. |
| 2011/0319500 A1 | 12/2011 | Suau |
| 2011/0319561 A1* | 12/2011 | Suau ...................... A61Q 19/00 977/773 |
| 2015/0183979 A1 | 7/2015 | Pabalan et al. |

FOREIGN PATENT DOCUMENTS

| | | |
|---|---|---|
| EP | 1 134 263 A1 | 9/2001 |
| EP | 2 556 192 | 2/2013 |
| EP | 2 585 503 | 5/2013 |
| FR | 2 796 403 A1 | 1/2001 |
| FR | 2 894 998 A1 | 6/2007 |
| FR | 2 961 816 A1 | 12/2011 |

OTHER PUBLICATIONS

International Search Report dated Mar. 18, 2019 in PCT/FR2018/053317 filed Dec. 17, 2018, 4 pages.
French Search Report dated May 18, 2018, in FR 17 62325 filed Dec. 18, 2017.

* cited by examiner

*Primary Examiner* — Michael M. Bernshteyn
(74) *Attorney, Agent, or Firm* — Oblon, McClelland, Maier & Neustadt, L.L.P.

(57) ABSTRACT

The invention relates to a paper coating slip composition comprising a copolymer of thickening acrylic acid, a mineral material in the form of particles, a binding agent, and water. The invention also relates to the use of said composition for the production of paper or cardboard, improving the water retention of the paper coating slip.

20 Claims, No Drawings

COMPOSITION FOR PAPER COATING SLIP

The invention relates to a composition for a paper coating colour comprising a thickening acrylic acid copolymer, a mineral material in particle form, a binding agent and water. The invention also relates to the use of this composition for the preparation of paper or cardboard while improving the water retention of the paper coating colour.

The copolymer of the composition according to the invention makes it possible to improve viscosity at low shear gradient, while improving water retention in the composition used.

There are known thickening copolymers used for the preparation of paper coating colours.

In addition to improving the final properties of paper prepared using these paper coating colours, it is also necessary to improve the conditions in which these compositions are prepared and used.

Moreover, these compositions must have viscosities at different shear gradients that allow them to be used effectively, particularly when applied to the surface finish of a sheet of paper. These compositions must have an apparent viscosity, thus at a low shear gradient, which is well suited to effective application.

Moreover, increasing the viscosities at high and low shear gradients can affect the migration of water and water-soluble substances through the paper. This migration should be reduced as much as possible, in particular to avoid a change in the rheology of the unused and recycled paper coating colour in the coating process. It is therefore necessary to properly control the water retention of the paper coating colour.

In addition, the viscosity of the compositions must be controlled and enable them to be easily pumped or filtered, especially in the feed circuits for the paper coating processes. These compositions must also make it possible to limit or prevent foaming or splashing. They must also limit or prevent settling of the particles used.

The compatibility of the various constituents in the paper coating colour must also be considered. It is particularly important that the thickening copolymer and binding latex used are suitably compatible.

Polymeric agents used as thickening agents do not always provide a satisfactory solution to these different problems.

There is thus a need for improved thickening agents to provide compositions for preparing paper coating colours.

In addition, and in particular for environmental reasons, there is also a great need for compositions for preparing paper coating colours comprising little or no methacrylic acid while offering sustained or improved performance compared to the known compositions. Indeed, the use of methacrylic acid, particularly methacrylic acid predominantly prepared from acetone cyanhydrin, which is a highly toxic compound, should be limited as far as possible.

EP 2585503 relates to methacrylic acid-free, alkali-swellable thickening emulsions that are prepared in the absence of surfactants. They are used to thicken aqueous media. FR 2961816 also relates to methacrylic acid-free, alkali-swellable thickening emulsions comprising AMPS that are prepared in the absence of surfactants.

EP 1134263 discloses a composition comprising a binding copolymer and a hydrophobically-modified alkali-soluble emulsion (HASE) polymer. EP 2534205 discloses a composition that can be used to increase the viscosity of a fluid, particularly when used for hydraulic fracturing, and which, in particular, comprises an anionic polysaccharide.

FR 2894998 relates to a method for producing paper coating colours comprising a comb polymer. FR 2796403 relates to the use of water-soluble copolymers in the preparation of paper sheets. EP 2556192 describes a paper coating colour comprising styrene latex as a rheology modification agent.

The aqueous composition for preparing a paper coating colour according to the invention provides a solution to all or part of the problems of the compositions of the prior art.

Thus, the invention provides an aqueous composition for preparing a paper coating colour comprising:
a) from 0.02 to 2% by dry mass of at least one copolymer prepared by polymerization reaction:
  (a1) of at least one compound (a1) chosen among:
    at least one compound (a1-1) chosen among acrylic acid alone, an acrylic acid salt alone and combinations thereof and
    at least one compound (a1-1) combined with a compound (a1-2) chosen among methacrylic acid, a methacrylic acid salt and combinations thereof, in an (a1-1)/(a1-2) weight ratio greater than 0.15.
  (a2) of at least one ester of an acid (a2) chosen among acrylic acid, methacrylic acid, itaconic acid, crotonic acid, maleic acid, maleic anhydride, and
  (a3) of at least one compound (a3) chosen among 2-acrylamido-2-methylpropane sulphonic acid, 2-sulphoethyl methacrylate, sodium methallyl sulphonate, styrene sulphonate, their salts and combinations thereof,
b) from 30 to 75% by dry mass of at least one mineral material in particle form,
c) from 2 to 25% by dry mass of at least one binding agent and
d) from 22.98 to 44.98% by mass of water.

Preferably according to the invention, the monomer (a1) is the only monomer (a1-1), particularly the only acrylic acid. In combination, the preferred monomer (a1-1) is also acrylic acid.

The preferred monomer (a1-2) according to the invention is methacrylic acid.

Particularly preferably, the (a1-1)/(a1-2) weight ratio is greater than 0.2 or 0.5, more particularly preferably greater than 1 or 2.

Even more particularly preferably, the (a1-1)/(a1-2) weight ratio is greater than 5 or 8, even more preferentially greater than 10 or 15.

Much more preferably, the (a1-1)/(a1-2) weight ratio is greater than 20 or 35, also more preferentially greater than 50 or 80.

According to the invention, the (a1-1)/(a1-2) weight ratio can range from 0.2 to 80, preferably from 0.5 to 50, more preferentially from 1 to 35, much more preferentially from 2 to 20, even more preferentially from 5 to 15 or from 8 to 10.

Also preferably according to the invention, the amount by mass of the monomer (a1-1) is greater than the amount by mass of the monomer (a1-2), preferably the amount by mass of the monomer (a1-1) is at least 1.5 times, 2 times, 3 times, 4 times, 5 times, 8 times, 10 times greater than the amount by mass of the monomer (a1-2).

The preferred monomer (a2) according to the invention is chosen among styrene, vinyl caprolactam, alkyl acrylate, in particular $C_1$-$C_{10}$ alkyl acrylate, preferentially $C_1$-$C_4$ (alkyl acrylate, more preferentially methyl acrylate, ethyl acrylate, propyl acrylate, isobutyl acrylate, n-butyl acrylate, alkyl methacrylate, particularly $C_1$-$C_{10}$ alkyl methacrylate, preferentially $C_1$-$C_4$ alkyl methacrylate, more preferentially methyl methacrylate, ethyl methacrylate, propyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate and combinations thereof, preferably ethyl acrylate or butyl acrylate, more preferentially ethyl acrylate.

The most preferred monomer (a2) according to the invention is chosen among methyl acrylate, ethyl acrylate, isobutyl acrylate, n-butyl acrylate, methyl methacrylate, more preferentially methyl acrylate or ethyl acrylate.

The preferred monomer salts (a3) are sodium and ammonium salts. The preferred monomer (a3) according to the invention is 2-acrylamido-2-methylpropane sulphonic acid (AMPS) or its sodium or ammonium salts.

According to the invention, the copolymer (a) can be prepared by a polymerization reaction also using at least one monomer (a4) which is a compound of formula (I):

$$R^1\text{-}(EO)_m\text{---}(PO)_n\text{---}R^2 \qquad (I)$$

wherein:
  m and n, identical or different, independently represent 0 or an integer or decimal less than 150, m or n is different from 0,
  EO represents a $CH_2CH_2O$ group,
  PO independently represents a group chosen among $CH(CH_3)CH_2O$ and $CH_2CH(CH_3)O$,
  $R^1$ represents a group comprising at least one polymerisable olefinic unsaturation, preferably a group chosen among acrylate, methacrylate, acryl urethane, methacryl urethane, vinyl, allyl, methallyl and isoprenyl, more preferentially a methacrylate group,
  $R^2$ represents a straight, branched or cyclical, saturated, unsaturated or aromatic hydrocarbon group comprising from 6 to 40 carbon atoms, preferably a $C_6$-$C_{40}$ alkyl group, straight or branched, preferably a $C_8$-$C_{30}$ alkyl group, straight or branched, a $C_6$-$C_{40}$ aryl group, preferably a $C_8$-$C_{30}$ aryl group such as a tristyryl phenyl group.

Preferably according to the invention, the monomer (a4) is a compound of formula (I) wherein:
  m represents an integer or decimal ranging from 20 to 40 and n is null or
  m and n independently represent an integer or decimal ranging from 5 to 100 or
  the mass ratio m/n ranges from 90/10 to 70/30.

More preferably according to the invention, the monomer (a4) is a compound of formula (I) wherein:
  m represents an integer or decimal ranging from 20 to 40 and n is null,
  m and n independently represent an integer or decimal ranging from 5 to 100 and
  the mass ratio m/n ranges from 90/10 to 70/30.

According to the invention, the copolymer (a) can be prepared by a polymerization reaction also using at least one monomer (a5) chosen among:
  polyalkylene glycol acrylate, preferably polyethylene glycol acrylate or polyethylene-polypropylene glycol acrylate,
  polyalkylene glycol methacrylate, preferably polyethylene glycol methacrylate or polyethylene-polypropylene glycol methacrylate,
  allyl polyalkylene glycol, preferably allyl polyethylene glycol or allyl polyethylene-polypropylene glycol,
  methallyl polyalkylene glycol, preferably methallyl polyethylene glycol or methallyl polyethylene-polypropylene glycol,
  3-methyl-3-buten-1-ylpolyalkylene glycol, preferably 3-methyl-3-buten-1-ylpolyethylene glycol or 3-methyl-3-buten-1-ylpolyethylene-polypropylene glycol.

The preferred monomer (a5) according to the invention is a polyalkylene glycol methacrylate, more preferentially polyethylene glycol methacrylate or polyethylene-polypropylene glycol methacrylate.

According to the invention, the copolymer (a) can be prepared by a polymerization reaction also using at least one cross-linking monomer (a6) or at least one monomer comprising at least two olefinic unsaturations.

Examples of monomer (a6) according to the invention are unsaturated cross-linking monomers, for example polyunsaturated aromatic monomers such as divinyl benzene, divinyl naphthalene and trivinyl benzene, polyunsaturated alicyclic monomers such as 1,2,4-trivinylcyclohexane, difunctional phthalic acid esters such as diallyl phthalate, polyalkenyl ethers such as triallyl pentaerythritol, diallyl pentaerythritol, diallyl sucrose, octaallyl sucrose and trimethylol propane diallyl ether, polyunsaturated polyalcohol or polyacid esters such as 1,6-hexanediol di(meth)acrylate, tetramethylene tri(meth)acrylate, allyl acrylate, diallyl itaconate, diallyl fumarate, diallyl maleate, trimethylol propane tri(meth)acrylate, trimethylol propane di(meth)acrylate, polyalkylene oxyglycol di(meth)acrylates and polyethylene glycol di(meth)acrylate, alkylene bisacryl amides such as methylene bisacryl amide and propylene bisacryl amide, hydroxy or carboxy derivatives of methylene bis-acrylamide such as N,N'-bismethylol methylene bisacryl amide, polyalkylene glycol di(meth)acrylates such as ethylene glycol di(meth)acrylate, diethylene glycol di(meth)acrylate, tri ethylene glycol di(meth)acrylate, allyl methacrylate, ethylene glycol dimethacrylate, butylene glycol dimethacrylate, pentaerythritol di-, tri- and tetra-acrylates, polyalkylene oxyglycol di(meth)acrylates such as polyethylene glycol diacrylates, bisphenol A diacrylates, butane diol dimethacrylate, 2,2-dimethylpropanediol dimethacrylate, phenylene diacrylate and mixtures thereof.

The proportions of the different monomers used in the preparation of the copolymer (a) can vary rather significantly.

Preferably, the copolymer (a) comprises:
  from 20 to 69% by mass of monomer (a1),
  from 30 to 79% by mass of monomer (a2) and
  from 1 to 5% by mass of monomer (a3).

The copolymer (a) can also comprise:
  from 20 to 69% by mass of monomer (a1),
  from 29.5 to 78.5% by mass of monomer (a2),
  from 1 to 5% by mass of monomer (a3) and
  from 0.5 to 30% by mass of monomer (a4).

The copolymer (a) can also comprise:
  from 20 to 69% by mass of monomer (a1),
  from 29.5 to 78.5% by mass of monomer (a2),
  from 1 to 5% by mass of monomer (a3) and
  from 0.5 to 30% by mass of monomer (a5).

The copolymer (a) can also comprise:
  from 19.9 to 68.9% by mass of monomer (a1),
  from 30 to 79% by mass of monomer (a2),
  from 1 to 5% by mass of monomer (a3) and
  from 0.1 to 5% by mass of monomer (a6).

The copolymer (a) can also comprise:
  from 15 to 69% by mass of monomer (a1),
  from 29 to 83% by mass of monomer (a2),
  from 1 to 5% by mass of monomer (a3),
  from 0.5 to 30% by mass of monomer (a4) and
  from 0.5 to 30% by mass of monomer (a5).

The copolymer (a) can also comprise:

from 19.9 to 68.9% by mass of monomer (a1),
from 29.5 to 78.5% by mass of monomer (a2),
from 1 to 5% by mass of monomer (a3),
from 0.5 to 30% by mass of monomer (a4) and
from 0.1 to 5% by mass of monomer (a6).

The copolymer (a) can also comprise:
from 19.9 to 68.9% by mass of monomer (a1),
from 29.5 to 78.5% by mass of monomer (a2),
from 1 to 5% by mass of monomer (a3),
from 0.5 to 30% by mass of monomer (a5) and
from 0.1 to 5% by mass of monomer (a6).

The copolymer (a) can also comprise:
from 19.9 to 68.9% by mass of monomer (a1),
from 29 to 78% by mass of monomer (a2),
from 1 to 5% by mass of monomer (a3),
from 0.5 to 30% by mass of monomer (a4),
from 0.5 to 30% by mass of monomer (a5) and
from 0.1 to 5% by mass of monomer (a6).

In addition to the copolymer (a), the composition according to the invention comprises at least one mineral material in particle form.

Preferably according to the invention, the particles of mineral material have a size of less than 50 µm, or a size ranging from 0.05 µm to 50 µm. More preferably according to the invention, the particles of mineral material have a size of less than 10 µm or less than 5 µm. Much more preferably according to the invention, the particles of mineral material have a size of less than 2 µm or less than 1 µm or even less than 0.5 µm.

Also preferably according to the invention, the equivalent spherical diameter of the particles of mineral material, for a size ranging from 0.05 µm to 50 µm or less than 50 µm, is equal to 60% by weight or equal to 70% by weight.

Also preferably according to the invention, the equivalent spherical diameter of the particles of mineral material, for a size ranging from 0.05 µm to 50 µm or less than 50 µm, is equal to 80% by weight or equal to 90% by weight.

More preferably according to the invention, the equivalent spherical diameter of the particles of mineral material, for a size of less than 10 µm or for a size of less than 5 µm, is equal to 60% by weight or equal to 70% by weight.

Also more preferably according to the invention, the equivalent spherical diameter of the particles of mineral material, for a size of less than 10 µm or for a size of less than 5 µm, is equal to 80% by weight or equal to 90% by weight.

Much more preferably according to the invention, the equivalent spherical diameter of the particles of mineral material, for a size of less than 2 µm or less than 1 µm or even less than 0.5 µm, is equal to 60% by weight or equal to 70% by weight.

Also much more preferably according to the invention, the equivalent spherical diameter of the particles of mineral material, for a size of less than 2 µm or less than 1 µm or even less than 0.5 µm, is equal to 80% by weight or equal to 90% by weight.

The composition according to the invention can comprise a single mineral material (b) or two or three mineral materials (b). Preferably, the composition according to the invention comprises one or two mineral materials (b).

Preferably according to the invention, the mineral material (b) is of synthetic or natural origin. More preferably it is chosen among the alkaline-earth metal carbonates, preferably calcium carbonate (natural calcium carbonate or precipitated calcium carbonate), strontium carbonate, magnesium carbonate, barium carbonate, dolomite, kaolin, titanium dioxide, talcum, lime, calcium sulphate, barium sulphate, silica.

More preferentially, the mineral material (b) is calcium carbonate (natural calcium carbonate or precipitated calcium carbonate) or kaolin or combinations thereof.

In addition to the copolymer (a) and the mineral material (b), the composition according to the invention comprises at least one binding agent (c). Preferably, the binding agent (c) is a natural binding agent such as starch, carboxymethyl cellulose (CMC), hydroxyethyl celluloses, polyvinyl alcohol (PV-OH), casein, proteins and alginates. Also preferably, the binding agent (c) is a synthetic binding agent such as latex, preferably chosen among a styrene-butadiene polymer, a styrene-acrylic polymer, a styrene-acetate polymer, more preferentially a styrene-butadiene polymer. Also preferably, the binding agent (c) is a combination of at least one natural binding agent and of at least one synthetic binding agent.

The proportions of the different components of the composition according to the invention can vary to some extent. Preferably, the composition according to the invention comprises:
from 0.02 to 2% by dry mass of copolymer (a),
from 30 to 75% by dry mass of mineral material (b),
from 2 to 25% by dry mass of binding agent (c) and
from 22.98 to 44.98% by mass of water.

In addition to these four essential components, the composition according to the invention can also comprise at least one admixture, in particular at least one admixture chosen among dispersing agents, anti-foaming agents, biocides, colouring agents, lubricants and optical brighteners.

The composition according to the invention has several beneficial properties for the preparation of paper coating colours. These properties are particularly effective when preparing paper or cardboard.

Thus, the invention also provides a paper or cardboard preparation method comprising the use of an aqueous composition according to the invention. Preferably, this composition is used during one or more of the paper or cardboard coating steps.

Paper coating colours prepared according to the invention are particularly advantageous when preparing a primary coating layer (pre-coat) or when preparing a final paper coating layer (top coat) or even a simple coat.

In addition, when using the paper or cardboard preparation method comprising the use of an aqueous composition according to the invention, the water retention of the composition during the paper coating step is improved. Preferably, the composition's water retention is improved from 50 to 400% by volume compared to when no copolymer (a) is used.

Also, when using the paper or cardboard preparation method comprising the use of an aqueous composition according to the invention, the viscosity of the composition is controlled due to the properties of the copolymer (a). Preferably, the method according to the invention comprises the use of a composition according to the invention which has a low shear viscosity (Brookfield viscosity at 100 rpm) that is sufficient and compatible with the coating process and superior to the composition which does not use the copolymer. More preferably, the viscosity under low shear (Brookfield viscosity at 100 rpm) ranges from 150 to 3,500 mPa·s.

Preferably, when using the composition according to the invention in the preparation of paper or cardboard, the composition is deposited on the surface of the paper or cardboard in at least one coating step with a coat weight, after drying, of from 5 to 50 g/m², more preferentially from 8 to 40 g/m².

The coating can be deposited using a blade or crayon process, a film transfer press, an air knife, a size press or a curtain coating process.

The following examples illustrate the various aspects of the invention, particularly the preparation and characterization of paper coating colour compositions according to the invention, and then compares them to comparative paper coating colour compositions that do not comprise a polymeric thickening agent or which include a known commercial thickener.

EXAMPLES

Example 1: Preparation and Characterization of Copolymers According to the Invention All of the synthesis reactions of copolymers (a) in the paper coating colour compositions according to the invention were carried out in a cylindrical glass reactor with a usable volume of 1 litre equipped with anchor-type mechanical agitation and oil bath heating. Stirring was maintained throughout the synthesis.

Using a heat chamber at 110° C., the solids content of the synthesized products was measured. One gram of product was placed in the heat chamber for 1 hour. The difference in mass before and after drying enabled the solids content to be determined.

Preparation and Characterization of the Copolymer (P1) According to the Invention In the glass reactor, an initial load comprised of 725 g of deionised water and 1.15 g of sodium bicarbonate are placed.

In a first glass beaker, 136.43 g of monomer (a1-1) according to the proportions shown in table 1 and 204.99 g of ethyl acrylate (a2) are weighed.

In a second glass beaker, 1.0 g of ammonium persulphate is weighed and then dissolved in 10 g of deionised water.

In a third glass beaker, 0.1 g of sodium metabisulphite is weighed and then dissolved in 10 g of deionised water.

In a disposable syringe, 7.5 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.15 g of ammonium persulphate dissolved in 20 g of deionised water are then added, over 1 hour, keeping the temperature at 76° C.±2° C. To finish, bake for 1 hour before allowing the medium to cool and then filtering it. No scaling appears when preparing the copolymer.

A copolymer (P1) is obtained at 28.4% by weight of solids content of which the composition is detailed in table 1.

Preparation and Characterization of Copolymer (P2) According to the Invention

In the glass reactor, an initial load comprised of 440 g of deionised water, 3.45 g of sodium dodecyl sulphate and 0.43 g of sodium bicarbonate are placed.

In a first glass beaker, 116 g of monomer (a1-1) according to the proportions shown in table 1, 198 g of ethyl acrylate (a2), 1.12 g of sodium dodecyl sulphate, 0.14 g of sodium bicarbonate and 150 g of deionised water are weighed.

In a second glass beaker, 1.0 g of ammonium persulphate is weighed and then dissolved in 10 g of deionised water.

In a third glass beaker, 0.1 g of sodium metabisulphite is weighed and then dissolved in 10 g of deionised water.

In a disposable syringe, 11.43 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.15 g of ammonium persulphate dissolved in 20 g of deionised water are then added, over 5 minutes, keeping the temperature at 76° C.±2° C. To finish, bake for 1 hour before allowing the medium to cool and then filtering it. No scaling appears when preparing the copolymer.

A copolymer (P2) is obtained at 32.7% by weight of solids content of which the composition is detailed in table 1.

Preparation and Characterization of Copolymer (P3) According to the Invention

In the glass reactor, an initial load comprised of 440 g of deionised water and 3.45 g of sodium dodecyl sulphate are placed.

In a first glass beaker, 116 g of monomer (a1-1) according to the proportions shown in table 1, 198 g of ethyl acrylate (a2), 1.12 g of sodium dodecyl sulphate and 150 g of deionised water are weighed.

In a second glass beaker, 1.0 g of ammonium persulphate is weighed and then dissolved in 10 g of deionised water.

In a third glass beaker, 0.1 g of sodium metabisulphite is weighed and then dissolved in 10 g of deionised water.

In a disposable syringe, 11.43 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours and 15 minutes at a temperature of 76° C.±2° C.

To finish, bake for 1 hour before allowing the medium to cool and then filtering it. No scaling appears when preparing the copolymer.

A copolymer (P3) is obtained at 32.5% by weight of solids content of which the composition is detailed in table 1.

Preparation and Characterization of Copolymer (P4) According to the Invention

In the glass reactor, an initial load comprised of 456.16 g of deionised water and 3.45 g of sodium dodecyl sulphate are placed.

In a first glass beaker, 62.96 g of monomer (a1-1) according to the proportions shown in table 1, 96.71 g, of monomer (a1-2) according to the proportions shown in table 1, 153.59 g of ethyl acrylate (a2), 1.585 g of monomer (a4) of formula (I) in which $R^1$ represents a methacrylate group, $R^2$ represents a straight $C_{22}$ alkyl group, m=25 and n=0 (($C_{22}$)—$OE_{25}$ docosanol methacrylate), 1.12 g of sodium dodecyl sulphate and 160.37 g of deionised water are weighed.

In a second glass beaker, 0.979 g of ammonium persulphate is weighed and then dissolved in 5 g of deionised water.

In a third glass beaker, 0.098 g of sodium metabisulphite is weighed and then dissolved in 2 g of deionised water.

In a disposable syringe, 11.4 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.15 g of ammonium persulphate dissolved in 20 g of deionised water are the added, over 1 hour, keeping the temperature at 76° C.±2° C. To finish, bake for 1 hour before allowing the medium to cool and then filtering it. No scaling appears when preparing the copolymer.

A copolymer (P4) is obtained at 32.3% by weight of solids content of which the composition is detailed in table 1.

Preparation and Characterization of Copolymer (P5) According to the Invention

In the glass reactor, an initial load comprised of 456.16 g of deionised water, 1.15 g of sodium bicarbonate and 3.45 g of sodium dodecyl sulphate are placed.

In a first glass beaker, 134.92 g of monomer (a1-1) according to the proportions shown in table 1, 1.1095 g, of monomer (a1-2) according to the proportions shown in table 1, 177.19 g of ethyl acrylate (a2), 1.585 g of monomer (a4) of formula (I) in which $R^1$ represents a methacrylate group, $R^2$ represents a straight $C_{22}$ alkyl group, m=25 and n=0 (($C_{22}$)—$OE_{25}$ docosanol methacrylate), 1.12 g of sodium dodecyl sulphate and 160.37 g of deionised water are weighed.

In a second glass beaker, 0.979 g of ammonium persulphate is weighed and then dissolved in 5 g of deionised water.

In a third glass beaker, 0.098 g of sodium metabisulphite is weighed and then dissolved in 2 g of deionised water.

In a disposable syringe, 11.4 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.15 g of ammonium persulphate dissolved in 20 g of deionised water are then added, over 1 hour, keeping the temperature at 76° C.±2° C. To finish, bake for 1 hour before allowing the medium to cool and then filtering it. No scaling appears when preparing the copolymer.

A copolymer (P5) is obtained at 31.7% by weight of solids content of which the composition is detailed in table 1.

Preparation and Characterization of Copolymer (P6) According to the Invention

In the glass reactor, an initial load comprised of 458.75 g of deionised water, 6.46 g of sodium dodecyl sulphate and 5.41 g of tridecyl alcohol tri-ethoxylate (Rhodasurf ID030, Solvay) are placed.

In a first glass beaker, 103.66 g of monomer (a1-1) according to the proportions shown in table 1, 20.11 g of monomer (a1-2) according to the proportions shown in table 1, 158.06 g of ethyl acrylate (a2), 21.05 g of monomer (a4) of formula (I) in which $R^1$ represents a methacrylate group, $R^2$ represents an alkyl group derived from a $C_{16}$ Guerbet alcohol, m=25 and n=0 ($C_{16}$-$OE_{25}$ Guerbet alcohol methacrylate), 2.26 g of sodium dodecyl sulphate, 0.065 g of dodecyl mercaptan and 136.72 g of deionised water are weighed.

In a second glass beaker, 0.917 g of ammonium persulphate is weighed and then dissolved in 4.85 g of deionised water.

In a third glass beaker, 0.092 g of sodium metabisulphite is weighed and then dissolved in 19.39 g of deionised water.

In a disposable syringe, 5.28 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.101 g of ammonium persulphate dissolved in 51.5 g of deionised water are then added, over 5 minutes, keeping the temperature at 76° C.±2° C. To finish, bake for 1 hour before allowing the medium to cool and then filtering it. No scaling appears when preparing the copolymer.

A copolymer (P6) is obtained at 30.1% by weight of solids content of which the composition is detailed in table 1.

Preparation and Characterization of Copolymer (P7) According to the Invention

In the glass reactor, an initial load comprised of 458.75 g of deionised water, 6.46 g of sodium dodecyl sulphate and 5.41 g of tridecyl alcohol tri-ethoxylate (Rhodasurf ID030, Solvay) are placed.

In a first glass beaker, 82.93 g of monomer (a1-1) according to the proportions shown in table 1, 40.84 g of monomer (a1-2) according to the proportions shown in table 1, 158.06 g of ethyl acrylate (a2), 21.05 g of monomer (a4) of formula (I) in which $R^1$ represents a methacrylate group, $R^2$ represents an alkyl group derived from a $C_{16}$ Guerbet alcohol, m=25 and n=0 ($C_{16}$-$OE_{25}$ Guerbet alcohol methacrylate), 2.26 g of sodium dodecyl sulphate, 0.065 g of dodecyl mercaptan and 136.72 g of deionised water are weighed In a second glass beaker, 0.917 g of ammonium persulphate is weighed and then dissolved in 4.85 g of deionised water.

In a third glass beaker, 0.092 g of sodium metabisulphite is weighed and then dissolved in 19.39 g of deionised water.

In a disposable syringe, 5.28 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.101 g of ammonium persulphate dissolved in 51.5 g of deionised water are then added, over 5 minutes, keeping the temperature at 76° C.±2° C. To finish, bake for 1 hour before allowing the medium to cool and then filtering it. No scaling appears when preparing the copolymer.

A copolymer (P7) is obtained at 30.1% by weight of solids content of which the composition is detailed in table 1.

Preparation and Characterization of Copolymer (P8) According to the Invention

In the glass reactor, an initial load comprised of 475 g of deionised water, 6.46 g of sodium dodecyl sulphate and 5.41 g of tridecyl alcohol tri-ethoxylate (Rhodasurf ID030, Solvay) are placed.

In a first glass beaker, 28.84 g of monomer (a1-1) according to the proportions shown in table 1, 102.97 g of monomer (a1-2) according to the proportions shown in table 1, 143.93 g of ethyl acrylate (a2), 12.69 g of monomer (a4) of formula (I) in which $R^1$ represents a methacrylate group, $R^2$ represents an alkyl group derived from a $C_{16}$ Guebet alcohol, m=25 and n=0 ($C_{16}$-$OE_{25}$ Guerbet alcohol methacrylate), 2.26 g of sodium dodecyl sulphate, and 139.76 g of deionised water are weighed.

In a second glass beaker, 0.92 g of ammonium persulphate is weighed and then dissolved in 4.85 g of deionised water.

In a third glass beaker, 0.092 g of sodium metabisulphite is weighed and then dissolved in 4.85 g of deionised water.

In a disposable syringe, 5.28 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.101 g of ammonium persulphate dissolved in 51.5 g of deionised water are then added, over 5 minutes, keeping the temperature at 76° C.±2° C.

To finish, bake for 1 hour before allowing the medium to cool and then filtering it. No scaling appears when preparing the copolymer.

A copolymer (P8) is obtained at 30.4% by weight of solids content of which the composition is detailed in table 1.

Preparation and Characterization of Copolymer (P9) According to the Invention

In the glass reactor, an initial load comprised of 475 g of deionised water, 6.46 g of sodium dodecyl sulphate and 5.41 g of tridecyl alcohol tri-ethoxylate (Rhodasurf ID030, Solvay) are placed.

In a first glass beaker, 28.84 g of monomer (a1-1) according to the proportions shown in table 1, 102.97 g, of monomer (a1-2) according to the proportions shown in table 1, 143.93 g of ethyl acrylate (a2), 12.69 g of monomer (a4) of formula (I) in which $R^1$ represents a methacrylate group, $R^2$ represents a straight $C_{18}$ alkyl group, m=25 and n=0, 2.26 g of sodium dodecyl sulphate and 139.76 g of deionised water are weighed.

In a second glass beaker, 0.92 g of ammonium persulphate is weighed and then dissolved in 4.85 g of deionised water.

In a third glass beaker, 0.092 g of sodium metabisulphite is weighed and then dissolved in 4.85 g of deionised water.

| Copolymer | Monomer amount-% by weight) | | | |
|---|---|---|---|---|
| | (a1) | (a2) | (a3) | (a4) |
| P1 | AA (39.52) | EA (59.39) | AMPS (1.09) | — |
| P2 | AA (36.28) | EA (61.93) | AMPS (1.79) | — |
| P3 | AA (36.28) | EA (61.93) | AMPS (1.79) | — |

In a disposable syringe, 5.28 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.101 g of ammonium persulphate dissolved in 51.5 g of deionised water are then added, over 5 minutes, keeping the temperature at 76° C.±2° C.

To finish, bake for 1 hour before allowing the medium to cool and then filtering it. No scaling appears when preparing the copolymer.

A copolymer (P9) is obtained at 29.9% by weight of solids content, of which the composition is detailed in table 1.

TABLE 1

| P4 | AA (19.64) | EA | AMPS | $(C_{22})$—$OE_{25}$ docosanol |
| | MAA (30.17) | (47.92) | (1.78) | methacrylate (0.49) |
| P5 | AA (42.10) | EA | AMPS | $(C_{22})$—$OE_{25}$ docosanol |
| | MAA (0.35) | (55.28) | (1.78) | methacrylate (0.49) |
| P6 | AA (33.93) | EA | AMPS | $C_{16}$—$OE_{25}$ Guerbet alcohol |
| | MAA (6.58) | (51.73) | (0.86) | methacrylate (6.90) |
| P7 | AA (27.14) | EA | AMPS | $C_{16}$—$OE_{25}$ Guerbet alcohol |
| | MAA (13.37) | (51.73) | (0.86) | methacrylate (6.90) |

TABLE 1-continued

| P8 | AA (9.91) | EA | AMPS | $C_{16}$—$OE_{25}$ Guerbet alcohol |
| | MAA (35.38) | (49.45) | (0.91) | methacrylate (4.35) |
| P9 | AA (9.91) | EA | AMPS | $C_{18}$—$OE_{25}$ straight alcohol |
| | MAA (35.38) | (49.45) | (0.91) | methacrylate (4.35) |

AA: acrylic acid
MAA: methacrylic acid
EA: ethyl acrylate

Example 2: Preparation and Characterization of Comparative Copolymers

Preparation and Characterization of the Comparative Copolymer (PC1)

In the glass reactor, an initial load comprised of 475 g of deionised water, 6.46 g of sodium dodecyl sulphate and 5.41 g of tridecyl alcohol tri-ethoxylate (Rhodasurf ID030, Solvay) are placed.

In a first glass beaker, 28.84 g of monomer (a1-1) according to the proportions shown in table 2, 102.97 g of monomer (a1-2) according to the proportions shown in table 2, 143.93 g of ethyl acrylate (a2), 12.69 g of monomer (a4) of formula (I) in which $R^1$ represents a methacrylate group, $R^2$ represents an alkyl group derived from a $C_{16}$ Guerbet alcohol, m=25 and n=0, 2.26 g of sodium dodecyl sulphate, and 139.76 g of deionised water are weighed.

In a second glass beaker, 0.92 g of ammonium persulphate is weighed and then dissolved in 4.85 g of deionised water.

In a third glass beaker, 0.092 g of sodium metabisulphite is weighed and then dissolved in 4.85 g of deionised water.

Heat the reactor content to 76° C.±2° C.

Inject the reagents from the 3 containers into the polymerization reactor. The reaction medium is then kept at 76° C.±2° C. for 2 hours.

0.101 g of ammonium persulphate dissolved in 51.5 g of deionised water are then added, over 5 minutes, keeping the temperature at 76° C.±2° C.

To finish, bake for 1 hour before allowing the medium to cool and then filtering it. Scaling appeared in the reactor, in an amount of 100 g. It proved impossible to obtain comparative copolymer (PC1).

Preparation and Characterization of the Comparative Copolymer (PC2)

In the glass reactor, an initial load comprised of 475 g of deionised water, 6.46 g of sodium dodecyl sulphate and 5.41 g of tridecyl alcohol tri-ethoxylate (Rhodasurf ID030, Solvay) are placed.

In a first glass beaker, 28.84 g of monomer (a1-1) according to the proportions shown in table 2, 102.97 g of monomer (a1-2) according to the proportions shown in table 2, 143.93 g of ethyl acrylate (a2), 12.69 g of monomer (a4) of formula (I) in which $R^1$ represents a methacrylate group, $R^2$ represents a combination of straight $C_{16}$ and $C_{18}$ alkyl groups, m=25 and n=0, 2.26 g of sodium dodecyl sulphate, and 139.76 g of deionised water are weighed.

In a second glass beaker, 0.92 g of ammonium persulphate is weighed and then dissolved in 4.85 g of deionised water.

In a third glass beaker, 0.092 g of sodium metabisulphite is weighed and then dissolved in 4.85 g of deionised water.

Heat the reactor content to 76° C.±2° C.

Inject the reagents from the 3 containers into the polymerization reactor. The reaction medium is then kept at 76° C.±2° C. for 2 hours.

0.101 g of ammonium persulphate dissolved in 51.5 g of deionised water are then added, over 5 minutes, keeping the temperature at 76° C.±2° C.

To finish, bake for 1 hour before allowing the medium to cool and then filtering it.

Scaling appeared in the reactor, in an amount of 100 g. It proved impossible to obtain comparative copolymer (PC2).

Preparation and Characterization of the Comparative Copolymer (PC3)

In the glass reactor, an initial load comprised of 451.28 g of deionised water and 3.45 g of sodium dodecyl sulphate are placed.

In a first glass beaker, 116.04 g of monomer (a1-2) according to the proportions shown in table 2, 198.55 g of ethyl acrylate (a2), 1.12 g of sodium dodecyl sulphate and 161.01 g of deionised water are weighed.

In a second glass beaker, 0.979 g of ammonium persulphate is weighed and then dissolved in 5 g of deionised water.

In a third glass beaker, 0.098 g of sodium metabisulphite is weighed and then dissolved in 2 g of deionised water.

In a disposable syringe, 11.4 g of 2-acrylamido-2-methylpropane sulphonic acid sodium salt (a3) at 50% by weight in water are weighed.

Heat the reactor content to 76° C.±2° C.

Inject the reagents from the 4 containers into the polymerization reactor over two hours at a temperature of 76° C.±2° C.

0.114 g of ammonium persulphate dissolved in 20 g of deionised water are then added, over 1 hour, keeping the temperature at 76° C.±2° C. To finish, bake for 1 hour before allowing the medium to cool and then filtering it. No scaling appears when preparing the copolymer.

A comparative copolymer (PC3) was obtained at 31.0% by weight of solids content, of which the composition is detailed in table 2.

AA: acrylic acid MAA: methacrylic acid EA: ethyl acrylate

TABLE 2

| Comparative Copolymer | Monomer (quantity-% by weight) | | | |
|---|---|---|---|---|
| | (a1) | (a2) | (a3) | (a4) |
| PC1 | AA (10.00) MAA (35.70) | EA (49.90) | — | $C_{16}$—$OE_{25}$ Guerbet alcohol methacrylate (4.40) |
| PC2 | AA (10.00) MAA (35.70) | EA (49.90) | — | $C_{16}$—$OE_{25}$ Guerbet alcohol methacrylate (4.40) |
| PC3 | MAA (36.22) | EA (62.00) | AMPS (1.78) | — |

Example 3: Preparation and Characterization of Paper Coating Colours According to the Invention and Comparatives The polymers according to the invention and polymers from the prior art were used in combination with the following products in the aqueous compositions for paper coating colours:

$CaCO_3$ pigment as mineral material: Hydrocarb 60, Hydrocarb 90 or Hydrocarb 95 products (Omya), at 78% by weight in water, binding agent: DL 1066 latex (Trinseo), at 55% by weight in water, binding agent: Stabilys A30 starch (Rocquette), at 25% by weight in water, polyvinyl alcohol as an optical brightener: (PV-OH) Mowiol 4-98 (Chang Chung Petrochemical), at 25% by weight in water.

The proportions (in g, dry for dry) of the constituents of the compositions for paper coating colours are shown in table 3.

The solids content of the paper coating colours are measured dry using a CEM microwave scales. A piece of sandpaper is coated with paper coating colour at a mass determined between 1 and 4 g. Then it is dried in the microwave scales.

The scales stop drying when the weight no longer changes for 10 sec. The weight difference is expressed in %, which determines the solids content.

The pH is measured at 25° C. using a WTW pH-meter with a conventional electrode coupled to a temperature probe.

The Brookfield viscosity of the compositions prepared is measured at 100 rpm at 25° C. using an analogue viscosity meter. The spindle is chosen according to the viscosity of the composition studied so as to be within the optimal use range of the rheometer.

ACAV capillary viscosity at $10^6$ $s^{-1}$ is measured using an ACAV A2 capillary meter by ACA.

Water retention is determined with a Gradek AAGWR apparatus. This has a measuring chamber in which is placed a test paper (Blotter Paper Gradek Test) covered by a perforated plastic sheet (2 μm Gradek PCTE test filter). 10 mL of the paper coating colour is then placed in the chamber. The AAGWR apparatus allows pressure (1.5 bar) to be applied to the paper coating colour, which causes all or part of the water and the water-soluble substances in the coating to pass through the perforated plastic sheet and migrate into the test paper. A pressure of 1.5 bar is applied for 90 sec. The difference between the weight of the test paper before measuring (P0) and after measuring (P1) gives the amount of water and water-soluble substances in the paper coating colour that migrated into the test paper during the measurement. The relative value of the increase in water retention is 1,250×(P1−P0)/P0.

The results obtained are shown in table 3.

TABLE 3

| | Composition | | | | | | | |
|---|---|---|---|---|---|---|---|---|
| | according to the invention | | | | | Comparative | | |
| | C1 | C2 | C3 | C4 | C5 | CC1 | CC2 | CC3 |
| (a) polymer P1 | 0.12 | | | | | | | |
| (a) polymer P2 | | 0.4 | | | | | | |
| (a) polymer P3 | | | 0.4 | | | | | |
| (a) polymer P6 | | | | 0.2 | | | | |
| (a) polymer P7 | | | | | 0.2 | | | |
| polymer PC3 | | | | | | | | 0.4 |
| (b) Hydrocarb 60 | 100 | | | | | 100 | | |
| (b) Hydrocarb 90 | | 100 | 100 | 20 | 20 | | 100 | 20 |
| (b) Hydrocarb 95 | | | | 80 | 80 | | | 80 |
| (c) DL 1066 latex | 7 | 8 | 8 | 7 | 7 | 7 | 8 | 7 |
| (c) Stabilys A30 | | | | 1 | 1 | | | 1 |
| Mowiol PV-OH 4-98 | 1 | | | 0.5 | 0.5 | 1 | | 0.5 |
| Solids content (%) | 71 | 63 | 63 | 67.1 | 67.1 | 71 | 63 | 67.1 |
| pH after addition of NaOH 12.5% by weight in water | 9.2 | 8.5 | 8.5 | 8.8 | 8.8 | 9.2 | 8.5 | 8.8 |
| Brookfield viscosity @ 100 rpm (mPa · s) | 710 | 1,270 | 1,140 | 2,515 | 2,230 | 285 | 1,110 | 380 |

TABLE 3-continued

| | Composition | | | | | | | |
|---|---|---|---|---|---|---|---|---|
| | according to the invention | | | | | Comparative | | |
| | C1 | C2 | C3 | C4 | C5 | CC1 | CC2 | CC3 |
| Acav HSV viscosity @ $10^6 s^{-1}$ (mPa · s) | 126 | | | 79 | 76 | 82 | | 53 |
| AAGWR water retention (2μm-1.5b-90s) (g/m$^2$) | 113 | 78 | 78 | 110 | 107 | 350 | 88 | 211 |

With respect to the comparative composition (CC1) which does not comprise a thickening agent, it was found that the presence of a small amount of polymer (P1) in the composition (C1) according to the invention makes it possible to control the viscosity at a high shear gradient as well as at a low shear gradient. The polymer (P1) also provides a good water retention to the paper coating colour.

With respect to the comparative composition (CC2) which comprises a thickening agent prepared from methacrylic acid and without acrylic acid, the presence of polymers (P2) and (P3) also makes it possible to improve these properties.

With respect to the comparative composition (CC3) which does not comprise a thickening agent, the presence of polymers (P6) and (P7) also makes it possible to provide good properties.

The invention claimed is:

1. An aqueous composition, comprising:
   a) from 0.02 to 2% by dry mass of at least one copolymer prepared by a polymerisation reaction comprising:
      at least one compound (a1) selected from the group consisting of:
         at least one compound (a1-1) selected from the group consisting of acrylic acid, an acrylic acid salt and combinations thereof; and
         at least one compound (a1-2) selected from the group consisting of methacrylic acid, a methacrylic acid salt and combinations thereof, in an (a1-1)/(a1-2) weight ratio of greater than 0.15;
      at least one compound (a2) selected from the group consisting of styrene, vinyl caprolactam, an ester of acrylic acid, an ester of methacrylic acid, an ester of itaconic acid, an ester of crotonic acid, an ester of maleic acid, an ester of maleic anhydride, and combinations thereof; and
      at least one compound (a3) selected from the group consisting of 2-acrylamido-2-methylpropane sulphonic acid, 2-sulphoethyl methacrylate, sodium methallyl sulphonate, styrene sulphonate, salts thereof and combinations thereof,
   b) from 30 to 75% by dry mass of at least one mineral material selected from the group consisting of an alkaline-earth carbonate, dolomite, kaolin, titanium dioxide and talcum in particle form,
   c) from 2 to 25% by dry mass of at least one binding agent, and
   d) 22.98 to 44.98% by mass of water.

2. The aqueous composition of claim 1, wherein:
   (a1) is (a1-1), or
   (a1-1) is acrylic acid, or
   (a1-2) is methacrylic acid, or
   the (a1-1)/(a1-2) weight ratio is greater than 0.2, or
   (a2) is alkyl acrylate or
   (a3) is 2-acrylamido-2-methylpropane sulphonic acid.

3. The aqueous composition of claim 1, wherein the polymerisation reaction further comprises:
   (a4) at least one compound of formula (I):

wherein:
   m and n, identical or different, independently represent 0 or an integer or decimal less than 150, and m or n is not 0,
   EO represents a $CH_2CH_2O$ group,
   each PO independently represents a group selected from the group consisting of $CH(CH_3)CH_2O$ and $CH_2CH(CH_3)O$,
   $R^1$ represents a group comprising at least one polymerisable olefinic unsaturation, and
   $R^2$ represents a straight, branched or cyclical, saturated, unsaturated or aromatic hydrocarbon group comprising from 6 to 40 carbon atoms; or
   (a5) at least one monomer selected from the group consisting of polyalkylene glycol acrylate, polyalkylene glycol methacrylate, allyl polyalkylene glycol, methallyl polyalkylene glycol and 3-methyl-3-buten-1-ylpolyalkylene glycol; or
   (a6) at least one cross-linking monomer or at least one monomer comprising at least two olefinic unsaturations.

4. The aqueous composition of claim 1, wherein:
   an amount by mass of (a1-1) is greater than an amount by mass of (a1-2); or
   the polymerisation reaction further comprises a compound (a4) of formula (I):

wherein:
   EO represents a $CH_2CH_2O$ group,
   each PO independently represents a group selected from the group consisting of $CH(CH_3)CH_2O$ and $CH_2CH(CH_3)O$,
   $R^1$ represents a group comprising at least one polymerisable olefinic unsaturation,
   $R^2$ represents a straight, branched or cyclical, saturated, unsaturated or aromatic hydrocarbon group comprising from 6 to 40 carbon atoms and
   m represents an integer or decimal ranging from 20 to 40 and n is null, or
   m and n independently represent an integer or decimal ranging from 5 to 100 or
   a mass ratio $(EO)_m/(PO)_n$ ranges from 90/10 to 70/30.

5. The aqueous composition of claim 1, wherein the at least one copolymer comprises:
   from 20 to 69% by mass of (a1),
   from 30 to 79% by mass of (a2) and
   from 1 to 5% by mass of (a3).

6. The aqueous composition of claim 1, wherein:
   the polymerisation reaction further comprises at least one compound (a4) of formula (I):

wherein:
   m and n, identical or different, independently represent 0 or an integer or decimal less than 150, and m or n is not 0,
   EO represents a $CH_2CH_2O$ group,
   each PO independently represents a group selected from the group consisting of $CH(CH_3)CH_2O$ and $CH_2CH(CH_3)O$, R¹ represents a group comprising at least one polymerisable olefinic unsaturation, and R² represents a straight, branched or cyclical, saturated, unsaturated or aromatic hydrocarbon group comprising from 6 to 40 carbon atoms; and the at least one copolymer comprises:
from 20 to 69% by mass of (a1),
from 29.5 to 78.5% by mass of (a2),
from 1 to 5% by mass of (a3) and
from 0.5 to 30% by mass of (a4).

7. The aqueous composition of claim 1, wherein:
the polymerisation reaction further comprises at least one monomer (a5) selected from the group consisting of polyalkylene glycol acrylate, polyalkylene glycol methacrylate, allyl polyalkylene glycol, methallyl polyalkylene glycol and 3-methyl-3-buten-1-ylpolyalkylene glycol; and the at least one copolymer comprises:
from 20 to 69% by mass of (a1),
from 29.5 to 78.5% by mass of (a2),
from 1 to 5% by mass of (a3) and
from 0.5 to 30% by mass of (a5).

8. The aqueous composition of claim 1, wherein:
the polymerisation reaction further comprises at least one cross-linking monomer or at least one monomer comprising at least two olefinic unsaturations (a6); and the at least one copolymer comprises:
from 19.9 to 68.9% by mass of (a1),
from 30 to 79% by mass of (a2),
from 1 to 5% by mass of (a3) and
from 0.1 to 5% by mass of (a6).

9. The aqueous composition of claim 1, wherein:
the polymerisation reaction further comprises:
at least one compound (a4) of formula (I):

$$R^1\text{-}(EO)_m\text{---}(PO)_n\text{---}R^2 \qquad (I)$$

wherein:
m and n, identical or different, independently represent 0 or an integer or decimal less than 150, and m or n is not 0, EO represents a CH₂CH₂O group, each PO independently represents a group selected from the group consisting of CH(CH₃)CH₂O and CH₂CH(CH₃)O, R¹ represents a group comprising at least one polymerisable olefinic unsaturation, and R² represents a straight, branched or cyclical, saturated, unsaturated or aromatic hydrocarbon group comprising from 6 to 40 carbon atoms, and at least one monomer (a5) selected from the group consisting of polyalkylene glycol acrylate, polyalkylene glycol methacrylate, allyl polyalkylene glycol, methallyl polyalkylene glycol and 3-methyl-3-buten-1-ylpolyalkylene glycol; and the at least one copolymer comprises:
from 15 to 69% by mass of (a1),
from 29 to 83% by mass of (a2),
from 1 to 5% by mass of (a3),
from 0.5 to 30% by mass of (a4) and
from 0.5 to 30% by mass of (a5).

10. The aqueous composition of claim 1, wherein:
the polymerisation reaction further comprises:
at least one compound (a4) of formula (I):

$$R^1\text{-}(EO)_m\text{---}(PO)_n\text{---}R^2 \qquad (I)$$

wherein:
m and n, identical or different, independently represent 0 or an integer or decimal less than 150, and m or n is not 0, EO represents a CH₂CH₂O group, each PO independently represents a group selected from the group consisting of CH(CH₃)CH₂O and CH₂CH(CH₃)O, R¹ represents a group comprising at least one polymerisable olefinic unsaturation, and R² represents a straight, branched or cyclical, saturated, unsaturated or aromatic hydrocarbon group comprising from 6 to 40 carbon atoms, and at least one cross-linking monomer or at least one monomer comprising at least two olefinic unsaturations (a6); and the at least one copolymer comprises:
from 19.9 to 68.9% by mass of (a1),
from 29.5 to 78.5% by mass of (a2),
from 1 to 5% by mass of (a3),
from 0.5 to 30% by mass of (a4) and
from 0.1 to 5% by mass of (a6).

11. The aqueous composition of claim 1, wherein:
the polymerisation reaction further comprises:
at least one monomer (a5) selected from the group consisting of polyalkylene glycol acrylate, polyalkylene glycol methacrylate, allyl polyalkylene glycol, methallyl polyalkylene glycol and 3-methyl-3-buten-1-ylpolyalkylene glycol; and at least one cross-linking monomer or at least one monomer comprising at least two olefinic unsaturations (a6); and the at least one copolymer comprises:
from 19.9 to 68.9% by mass of (a1),
from 29.5 to 78.5% by mass of (a2),
from 1 to 5% by mass of (a3),
from 0.5 to 30% by mass of (a5) and
from 0.1 to 5% by mass of (a6).

12. The aqueous composition of claim 1, wherein:
the polymerisation reaction further comprises:
at least one compound (a4) of formula (I):

$$R^1\text{-}(EO)_m\text{---}(PO)_n\text{---}R^2 \qquad (I)$$

wherein:
m and n, identical or different, independently represent 0 or an integer or decimal less than 150, and m or n is not 0, EO represents a CH₂CH₂O group, each PO independently represents a group selected from the group consisting of CH(CH₃)CH₂O and CH₂CH(CH₃)O, R¹ represents a group comprising at least one polymerisable olefinic unsaturation, and R² represents a straight, branched or cyclical, saturated, unsaturated or aromatic hydrocarbon group comprising from 6 to 40 carbon atoms, at least one monomer (a5) selected from the group consisting of polyalkylene glycol acrylate, polyalkylene glycol methacrylate, allyl polyalkylene glycol, methallyl polyalkylene glycol and 3-methyl-3-buten-1-ylpolyalkylene glycol; and at least one cross-linking monomer or at least one monomer comprising at least two olefinic unsaturations (a6); and the at least one copolymer comprises:
from 19.9 to 68.9% by mass of (a1),
from 29 to 78% by mass of (a2), from 1 to 5% by mass of (a3),
from 0.5 to 30% by mass of (a4),
from 0.5 to 30% by mass of (a5) and
from 0.1 to 5% by mass of (a6).

13. The aqueous composition of claim 1, wherein:
the particles of the at least one mineral material have a size of less than 50 μm, or
at least 60% by weight of the particles of the at least one mineral material have an equivalent spherical diameter of less than 50 μm.

14. The aqueous composition of claim 1, wherein:
a single mineral material (b) or two or three mineral materials (b) are used or
the at least one mineral material (b) is of synthetic or natural origin.

15. The aqueous composition of claim 1, wherein the at least one binding agent (c) is a natural binding agent or a synthetic binding agent.

16. The aqueous composition of claim 1, further comprising at least one admixture.

17. A method of paper or cardboard preparation, the method comprising contacting an article comprising paper or cardboard with the aqueous composition of claim 1.

18. The method of claim 17, wherein the method comprises coating the article comprising the paper or cardboard with the aqueous composition, and
a water retention of the aqueous composition during the coating is improved compared to when no copolymer (a) is used.

19. The method of claim 17, wherein the method comprises coating the article comprising the paper or cardboard with the aqueous composition, and the coating comprises depositing the aqueous composition on a surface of the paper or cardboard to provide a coat weight, after drying, of from 5 to 50 g/m$^2$.

20. An aqueous composition, comprising:
from 0.02 to 2% by dry mass of at least one copolymer prepared by a polymerisation reaction comprising:
at least one compound (a1-1) selected from the group consisting of acrylic acid, an acrylic acid salt and combinations thereof;
at least one compound (a1-2) selected from the group consisting of methacrylic acid, a methacrylic acid salt and combinations thereof, in an (a1-1)/(a1-2) weight ratio of greater than 0.15;
at least one compound (a2) selected from the group consisting of styrene, vinyl caprolactam, an ester of acrylic acid, an ester of methacrylic acid, an ester of itaconic acid, an ester of crotonic acid, an ester of maleic acid, an ester of maleic anhydride, and combinations thereof;
at least one compound (a3) selected from the group consisting of 2-acrylamido-2-methylpropane sulphonic acid, 2-sulphoethyl methacrylate, sodium methallyl sulphonate, styrene sulphonate, salts thereof and combinations thereof;
from 30 to 75% by dry mass of at least one mineral material in particle form;
from 2 to 25% by dry mass of at least one binding agent; and
22.98 to 44.98% by mass of water.

* * * * *